(12) United States Patent
Rubinstein et al.

(10) Patent No.: US 7,299,287 B1
(45) Date of Patent: Nov. 20, 2007

(54) SECURE NETWORK OUTLET FOR SUPPORTING IP DEVICE ADDRESS ASSIGNING FUNCTIONALITY

(75) Inventors: Alan Rubinstein, Fremont, CA (US); Gary Wang, Cupertino, CA (US); Yung-Fu Chang, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 566 days.

(21) Appl. No.: 10/086,009

(22) Filed: Feb. 27, 2002

Related U.S. Application Data (60) Provisional application No. 60/285,419, filed on Apr. 20, 2001, provisional application No. 60/277,767, filed on Mar. 20, 2001, provisional application No. 60/277,593, filed on Mar. 20, 2001, provisional application No. 60/277,592, filed on Mar. 20, 2001, provisional application No. 60/277,451, filed on Mar. 20, 2001.

(51) Int. Cl.
*G06F 15/16* (2006.01)
*G06F 15/177* (2006.01)

(52) U.S. Cl. .................. 709/228; 370/395.1; 370/225; 370/257; 340/539.3

(58) Field of Classification Search ........ 709/226–230, 709/238, 220, 245, 352; 707/10; 710/52; 370/401–402, 252, 235, 389, 392; 340/147
See application file for complete search history.

(56) References Cited

U.S. PATENT DOCUMENTS

| | | | | |
|---|---|---|---|---|
| 6,028,848 | A * | 2/2000 | Bhatia et al. | 370/257 |
| 6,154,465 | A * | 11/2000 | Pickett | 370/466 |
| 6,240,091 | B1 * | 5/2001 | Ginzboorg et al. | 370/401 |
| 6,288,639 | B1 * | 9/2001 | Addy | 340/539.3 |
| 6,618,353 | B2 * | 9/2003 | Merrill et al. | 370/225 |
| 6,769,000 | B1 * | 7/2004 | Akhtar et al. | 707/103 R |
| 6,798,751 | B1 * | 9/2004 | Voit et al. | 370/252 |
| 7,058,059 | B1 * | 6/2006 | Henry et al. | 370/395.1 |
| 2001/0036199 | A1 * | 11/2001 | Terry | 370/487 |

\* cited by examiner

*Primary Examiner*—David Wiley
*Assistant Examiner*—Jude J Jean-Gilles (57) ABSTRACT

A secure network outlet for supporting IP device address assigning functionality. A network access request is received from an electronic device communicatively coupled to intelligent hardware. In one embodiment, a device address request is transmitted to a network server. A first device address is received at the intelligent hardware from the network server. The intelligent hardware then assigns a second device address to the electronic device. In another embodiment, the intelligent hardware has a pre-assigned first device address and assigns a second device address to the electronic device, such that the intelligent hardware eliminates the need for a separate device address assigning server. The present invention reduces the consumption of global device addresses within a network, and also provides protection to electronic devices by hiding their device addresses from the external network.

18 Claims, 8 Drawing Sheets

Start

610
Receiving network access request from electronic device

620
Assigning a device address to the electronic device

End

Figure 8

SECURE NETWORK OUTLET FOR SUPPORTING IP DEVICE ADDRESS ASSIGNING FUNCTIONALITY

RELATED U.S. APPLICATIONS

This application claims priority to the copending provisional patent applications: patent application Ser. No. 60/277,593, entitled "'Intellijack' physical concepts," with filing date Mar. 20, 2001, and assigned to the assignee of the present invention; patent application Ser. No. 60/277,767, entitled "A method for managing intelligent hardware for access to voice and data networks," with filing date Mar. 20, 2001, and assigned to the assignee of the present invention; patent application Ser. No. 60/277,451, entitled "A method for filtering access to voice and data networks by use of intelligent hardware," with filing date Mar. 20, 2001, and assigned to the assignee of the present invention; patent application Ser. No. 60/277,592, "'Intellijack' usage," with filing date Mar. 20, 2001, and assigned to the assignee of the present invention; and patent application Ser. No. 60/285,419, "Intelligent concentrator," with filing date Apr. 20, 2001, and assigned to the assignee of the present invention.

FIELD OF INVENTION

The present invention relates to the field of computer networks. In particular, the present invention relates to secure network outlet for supporting internet protocol (IP) device address assigning functionality in an intelligent data concentrator.

BACKGROUND OF THE INVENTION

As computer networks increasingly proliferate in society, the number of devices coupled to computer networks grows at a fast rate. Traditionally, one cable connects a single RJ-45 port of the outlet to a local area network (LAN) wiring closet and multiple ports requires additional wiring. A network outlet, such as a switch or a hub, connects multiple network devices to LAN port located in a wiring closet.

Additional cables are needed for multiple ports on the network outlet, thereby increasing the network layout and cabling while limiting network accessibility. As one cable is required to connect each computer to the LAN port of the wiring closet, the costs associated with connecting more computers to the LAN are very high, particularly in wiring and installation costs. Additionally, each computer requires a unique global IP address assigned to the outlet. As such, a large number of global IP addresses are consumed.

One limitation with regards to computer networks is that there are only a limited number of global IP addresses. As it is becoming more necessary to connect more computers to LANs and the Internet, the number of global IP addresses being consumed is increasing, thus decreasing the available number of global IP addresses. Implementing Network Address Translation (NAT) technology in a network outlet is useful in saving the consumption of the global routable IP addresses within a LAN. Under NAT, one global IP address is assigned to the outlet for connection to the LAN while private IP addresses are used to control multiple devices within the personal area network (PAN).

One drawback to the use of network outlets, such as a stand-alone switch or a firewall device, is that the are subject to misuse or theft. Network outlets are typically unmanaged and do not have built-in access control. In particular, network outlets are typically not secure. Furthermore, network outlets implementing firewall/security policies are not centrally managed or distributed by a trusted source.

Accordingly, a need exists for a secure network outlet for coupling an electronic device to a network. A need also exists for a method and a device thereof which satisfies the above need for supporting IP device address assigning functionality. A need also exists for a method and device thereof which satisfies the above needs and which reduces the consumption of available global IP addresses within a network. A need also exists for a method and device thereof that satisfies the above needs and also protects PAN devices by hiding their IP addresses from the external network.

SUMMARY OF THE INVENTION

The present invention provides a secure network outlet for coupling an electronic device to a network. The present invention also provides a method and a device for supporting IP device address assigning functionality. The present invention also provides a method and device that reduces the consumption of available global IP addresses within a network. The present invention also provides a method and device that protects PAN devices by hiding their IP addresses from the external network.

In one embodiment, the present invention provides a method for performing device address assigning functionality in intelligent hardware. A network access request is received from an electronic device communicatively coupled to the intelligent hardware. In one embodiment, a device address request is transmitted to a network server. A first device address is received at the intelligent hardware from the network server. The intelligent hardware then assigns a second device address to the electronic device.

In another embodiment, the intelligent hardware has a pre-assigned first device address and assigns a second device address to the electronic device, such that the intelligent hardware eliminates the need for a separate device address assigning server. The present invention reduces the consumption of global device addresses within a network, and also provides protection to electronic devices by hiding their device addresses from the external network.

In one embodiment, the present invention comprises a first interface for communicatively coupling the intelligent hardware to the network and a second interface for communicatively coupling the intelligent device to a plurality of client devices. The intelligent device also comprises a processor coupled to the first interface. In one embodiment, the intelligent device also comprises a device address retriever for retrieving a device address from a network server and assigning a device address to a connected electronic device. In another embodiment, the intelligent device also comprises a device address assignor for assigning a device address to a connected electronic device, such that the intelligent device eliminates the need for a separate device address assigning server (e.g., network server).

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "assigning", "performing", "providing" or the like, refer to the actions and processes of a computer system, or similar electronic computing device, such as intelligent hardware or an intelligent data concentrator. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer-usable media of a computer system or intelligent hardware (e.g., an intelligent data concentrator). It is appreciated that the present invention can operate within a number of different computer systems including general purpose computer systems, embedded computer systems, and stand alone computer systems specially adapted for controlling automatic test equipment.

The present invention provides a secure network outlet for supporting IP device address assigning functionality. Specifically, the present invention provides intelligent hardware (e.g., an intelligent data concentrator) for assigning a device address to an electronic device communicatively coupled to the intelligent hardware. In one embodiment, the intelligent hardware can operate as either a device address retriever for communicating with a network server for assigning a device address. In another embodiment, the intelligent hardware operates as a network server for assigning a device address, such that the intelligent hardware eliminates the need for a separate device address assigning server.

Figure 1:
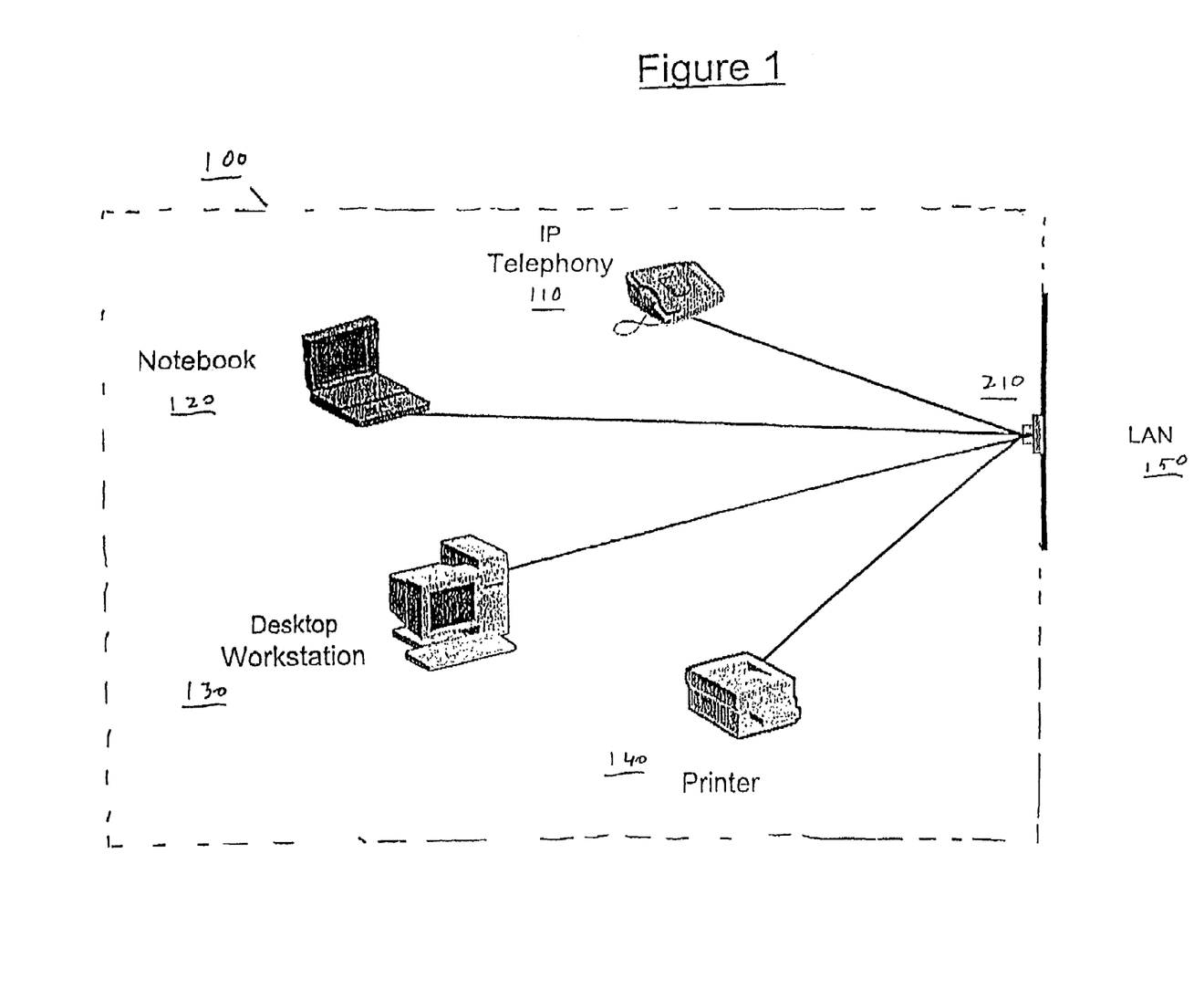
FIG. 1 illustrates an exemplary wired desktop cluster coupled to a local area network (LAN) in accordance with one embodiment of the present invention.

FIG. 1 illustrates an exemplary personal area network (PAN) 100 coupled to a local area network (LAN) 150 in accordance with one embodiment of the present invention. PAN 100 comprises IP telephony 110, notebook 120, desktop workstation 130, and printer 140, each of which is communicatively coupled to intelligent data concentrator 210. Intelligent data concentrator 210 is coupled to LAN 150, thus acting as an interface from the various client devices (e.g., comprises IP telephony 110, notebook 120, desktop workstation 130, and printer 140) to LAN 150.

In one embodiment, the electronic devices of PAN 100 (e.g., comprises IP telephony 110, notebook 120, desktop workstation 130, and printer 140) receive power over LAN 150 through intelligent data concentrator 210. In the present embodiment, a remote power source transmits power across LAN 150 to intelligent data concentrator 210. Electronic devices coupled to intelligent data concentrator 210 may be configured to receive power over LAN 150.

Figure 2:
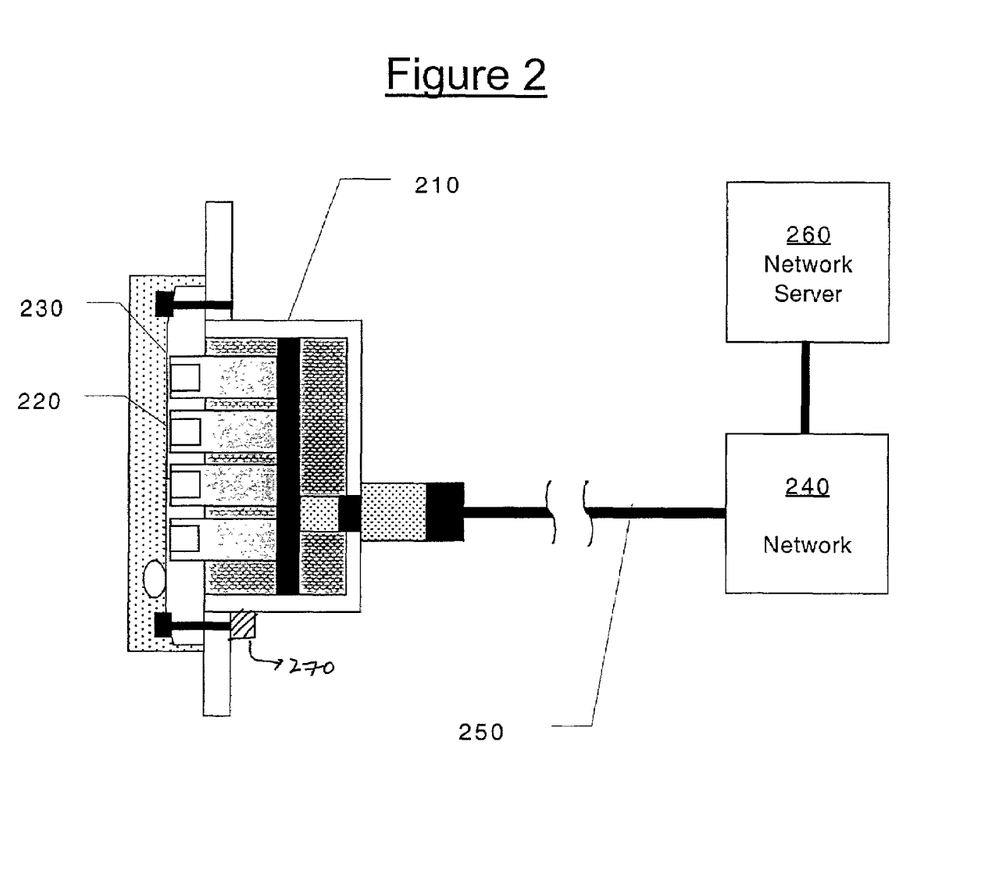
FIG. 2 is a block diagram of a cross-sectional view of an intelligent data concentrator in accordance with one embodiment of the present invention.

FIG. 2 is a block diagram 200 of a cross-sectional view of an intelligent data concentrator 210 in accordance with one embodiment of the present invention. This embodiment of the present invention implements intelligent hardware that is easy to install and reliably provides an attachment point for access to voice and data networks 240. The embodiment is implemented through miniaturized hardware that can be installed inside of a wall or in internal space provided for in an office cubicle. One surface 230 of this embodiment is intended to be accessible by the end user and would in most instances be on an external surface of a workspace.

A plurality of ports 220 are mounted on the external surface 230 of this embodiment. In one embodiment, communication port 220 is an RJ-45 jack. In another embodiment, port 220 is an RJ-11 jack. It should be appreciated that port 220 is not limited to any particular jack, and that any type of communication port can be used. Additionally, while intelligent data concentrator 210 illustrates four ports 220, it should be appreciated that alternative implementations could support a greater or lesser number of ports 220.

Connections to the central data (LAN) or voice network 240 are terminated at intelligent data concentrator 210 for coupling to ports 220. Termination of the network cabling 250 (voice or data) will provide for both a reliable electrical and mechanical connection for industry standard communications cabling such as CAT-3, CAT-5, CAT-5E or similar cabling.

In one embodiment, intelligent data concentrator 210 assigns a device address to electronic devices connected through ports 220 for communicating over network 240. Intelligent data concentrator 240 communicates with remote network server 260 for assigning device addresses to connected electronic devices. In one embodiment, intelligent data concentrator 210 operates as a device address retriever for communicating with network server 260 for assigning a device address.

In one embodiment, mounting hardware attaching intelligent data concentrator 210 to the wall also comprises a tamper detection means 270. In one embodiment, tamper detection means 270 is tamper detection hardware or a tamper detection switch. If a user attempts to circumvent the security measures by physically removing intelligent data concentrator 210, the act of removing the mounting screws would be detected by tamper detection means 270 and an alerting message would be transmitted to a central control site over network 240. In one embodiment, the attempt would be logged and a control message could be sent to a centralized management station that could disallow network traffic on the segment that intelligent data concentrator 210 was attached to.

Figure 3:
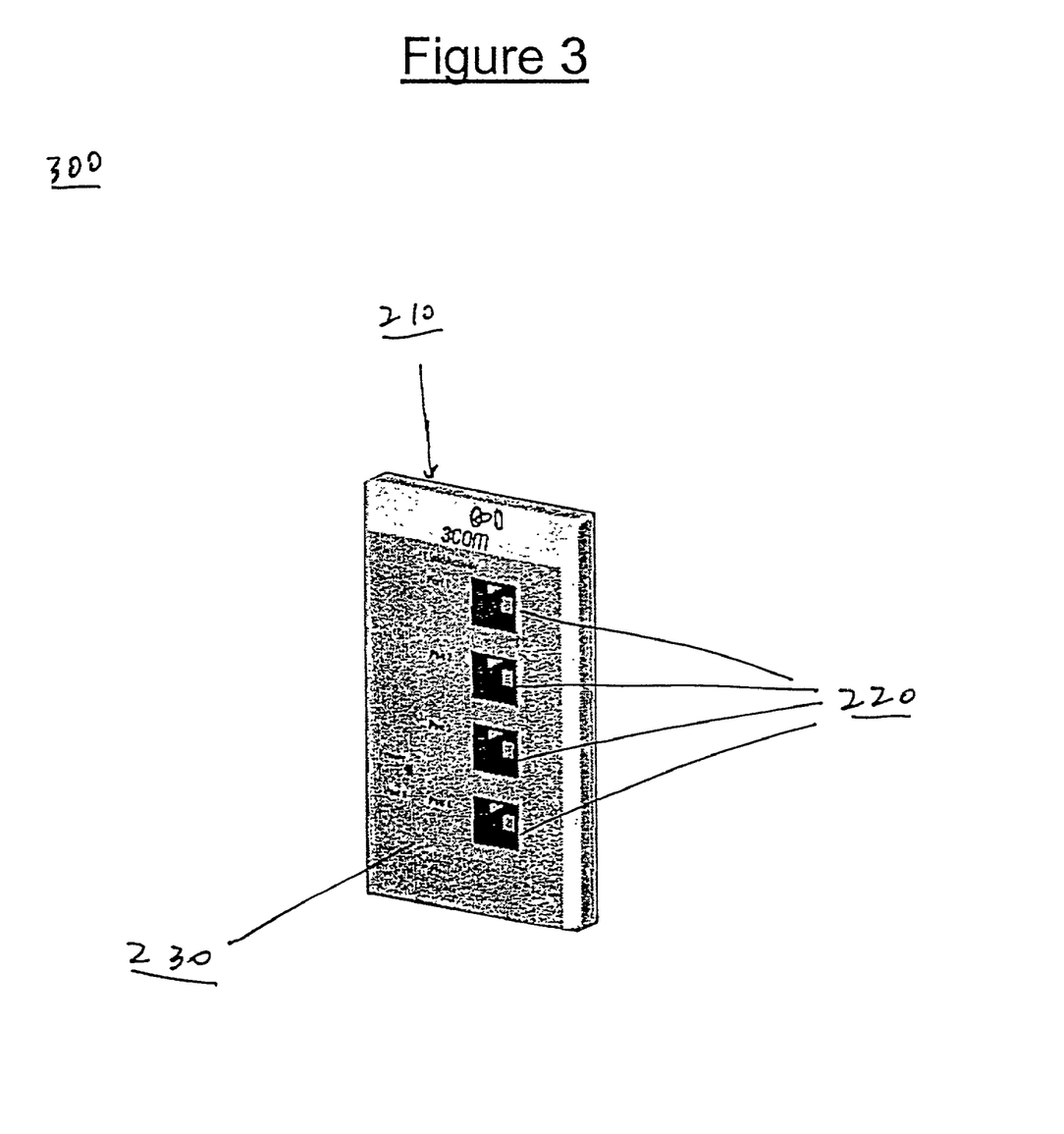
FIG. 3 is an illustration of a perspective view of an exemplary faceplate of an intelligent data concentrator in accordance with one embodiment of the present invention.

FIG. 3 is an illustration of a perspective view 300 of an exemplary user-accessible surface 230 of an intelligent data concentrator 210 in accordance with one embodiment of the present invention. A user is able to connect data devices to a voice or data network through ports 220. As described above, in one embodiment of the present invention, intelligent data concentrator 210 is configured to transmit power to connected electronic devices through ports 220.

Figure 4:
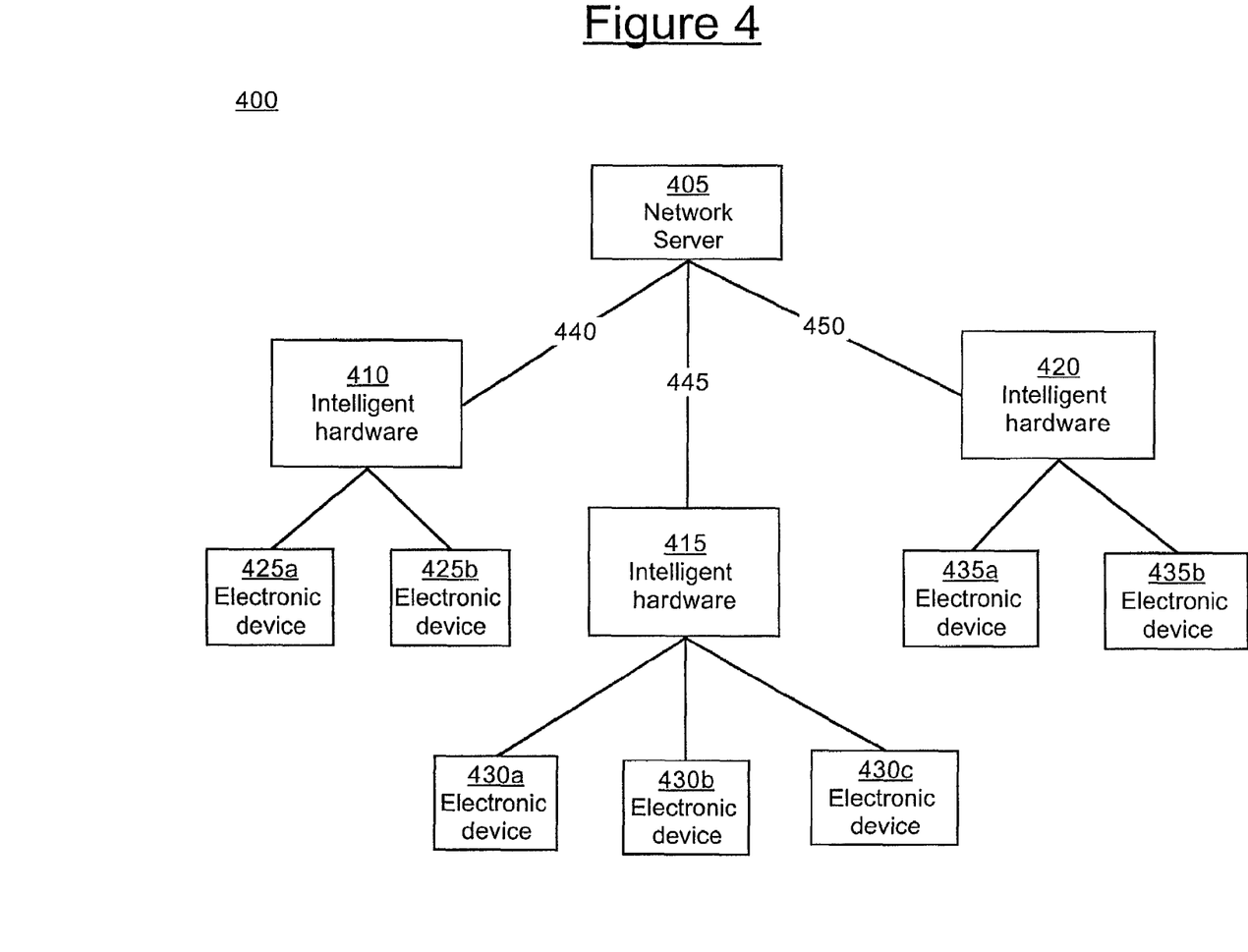
FIG. 4 is a block diagram of an exemplary network upon which embodiments of the present invention may be practiced.

FIG. 4 is a block diagram of an exemplary LAN 400 upon which embodiments of the present invention may be practiced. In one embodiment, LAN 400 comprises network server 405 and intelligent hardware 410, 415, and 420. In one embodiment, intelligent hardware 410, 415 and 420 are intelligent data concentrators (e.g., intelligent data concentrator 210 of FIG. 2, intelligent data concentrator 702 of FIG. 7 or intelligent data concentrator 802 of FIG. 8). In one embodiment, network server 405 is used for retrieving and assigning a device address to an electronic device communicatively coupled to intelligent hardware 410, 415 and 420. 420 are communicatively coupled to network server 405 over links 440, 445 and 450, respectively. In one embodiment, links 440, 445 and 450 are network cabling. In one embodiment, links 440, 445 and 450 also are coupled a power source (e.g. power source 250 of FIG. 2 or power source 609 of FIG. 6), such that they provide power to intelligent hardware 410, 415 and 420.

In one embodiment, intelligent hardware 410, 415 and 420 are connected to network server 405 by means of network cabling. In the current embodiment, CAT 3 or 5 cabling is used and an Ethernet physical interface is employed. However, it should be appreciated that the present invention will work with other types of LANs, such as LANs with differing physical connections or adopted for use in RF wireless and optical systems. As discussed above, in one embodiment, links 440, 445 and 450 also provide power to intelligent hardware 410, 415 and 420. In one embodiment, the power is supplied over network cabling.

Intelligent hardware 410 is coupled to electronic devices 425a and 425b. Similarly, intelligent hardware 415 is coupled to electronic devices 430a, 430b and 430c, and intelligent hardware 420 is coupled to electronic devices 435a and 435b. It should be appreciated that electronic devices can comprise any number of data devices or client devices, including but not limited to: computer systems, printers, voice IP telephones, and fax machines configured for use over voice IP networks.

In one embodiment, the intelligent hardware is configured to provide power to connected electronic devices. For example, in the present embodiment, intelligent hardware 410 supplies power to electronic devices 425a and 425b. It should be appreciated that electronic devices connected to an intelligent hardware may receive power over LAN 400. Power is supplied to the intelligent hardware, and an electronic device configured to receive power through the intelligent hardware receives its operating power through the intelligent hardware.

Figure 5:
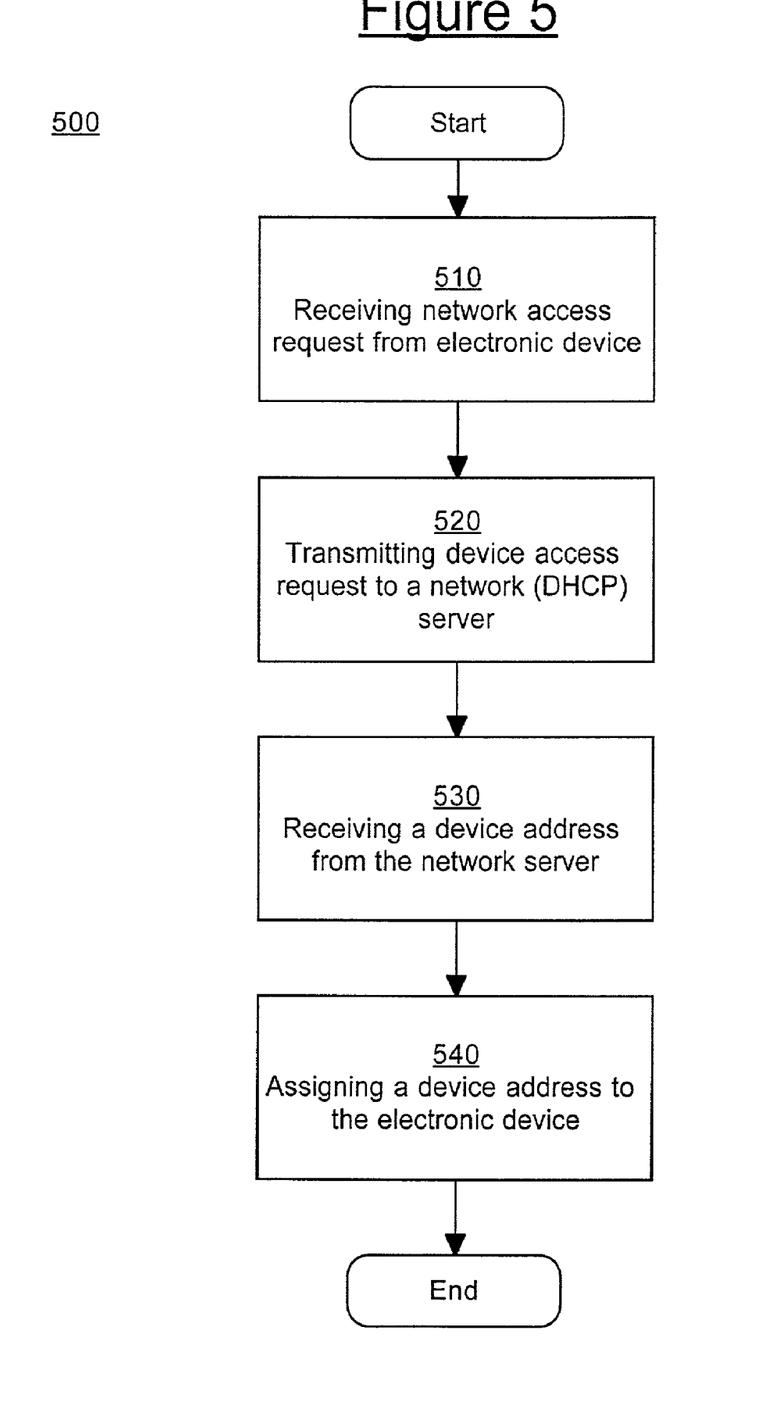
FIG. 5 is a flowchart diagram of the steps in a process for performing device address assigning functionality in intelligent hardware (e.g., an intelligent data concentrator) having a device address retriever in accordance with one embodiment of the present invention.

FIG. 5 is a flowchart diagram of the steps in a process 500 for performing device address assigning functionality in intelligent hardware (e.g., intelligent data concentrator 702 of FIG. 7) having a device address retriever in accordance with one embodiment of the present invention. Steps of process 500, in the present embodiment, may be implemented with any computer languages used by those of ordinary skill in the art.

At step 510 of process 500, the intelligent hardware having a device address retriever receives a network access request from a connected electronic device. It should be appreciated that a network access request is intended to include any request for data over a network. In one embodiment, the network access request is a request to communicate with a computer system located on a corporate network. In another embodiment, the network access request is a request to communicate with a computer system located on the Internet.

At step 520, the intelligent hardware transmits a device address request to a network server. It should be appreciated that in order for an electronic device to communicate over a network, it requires a device address. The device address operates to ensure that data packets are sent to the correct electronic device. In one embodiment, the device address is an Internet Protocol (IP) address. In one embodiment, the network server is a Dynamic Host Configuration Protocol (DHCP) server.

At step 530, the intelligent hardware receives a device address (e.g., and IP address) from the network server. In one embodiment, the device address is a global IP address.

At step 540, the intelligent hardware assigns a device address to the electronic device. In one embodiment, the intelligent hardware assigns the device address received from the network server to the electronic device. In another embodiment, the intelligent hardware assigns the electronic device a private device address. In one embodiment, the private device address is a private IP address. The present embodiment protects electronic devices connected to the intelligent hardware by hiding their IP addresses from the external network.

Figure 6:
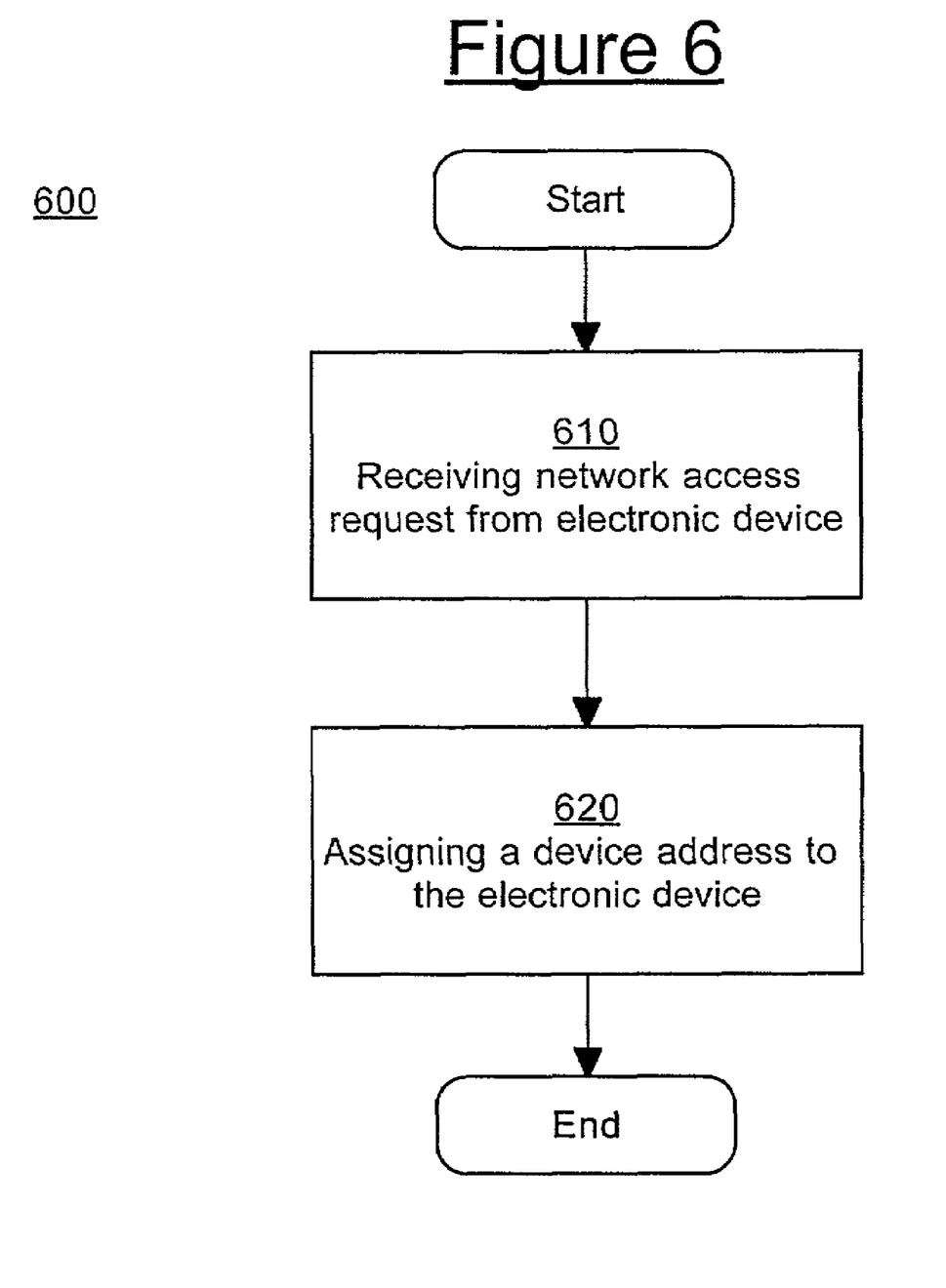
FIG. 6 is a flowchart diagram of the steps in a process for performing device address assigning functionality in intelligent hardware (e.g., an intelligent data concentrator) having a device address assignor in accordance with one embodiment of the present invention.

FIG. 6 is a flowchart diagram of the steps in a process 600 for performing device address assigning functionality in intelligent hardware (e.g., intelligent data concentrator 802 of FIG. 8) having a device address assignor in accordance with one embodiment of the present invention. Steps of process 600, in the present embodiment, may be implemented with any computer languages used by those of ordinary skill in the art.

At step 610 of process 600, the intelligent hardware having a device address assignor receives a network access request from a connected electronic device. It should be appreciated that a network access request is intended to include any request for data over a network. In one embodiment, the network access request is a request to communicate with a computer system located on a corporate network. In another embodiment, the network access request is a request to communicate with a computer system located on the Internet.

At step 620, the intelligent hardware assigns a device address to the electronic device, such that said intelligent hardware eliminates the need for a separate device address assigning server. In the present embodiment, the device address assignor operates as a device address assigning server. In one embodiment, the device address assignor operates as a DHCP server.

In one embodiment, the intelligent hardware assigns the electronic device a public device address. In another embodiment, the intelligent hardware assigns the electronic device a private device address. In one embodiment, the private device address is a private IP address. The present embodiment protects electronic devices connected to the intelligent hardware by hiding their IP addresses from the external network. In one embodiment, the intelligent hardware has a preassigned device address.

Figure 7:
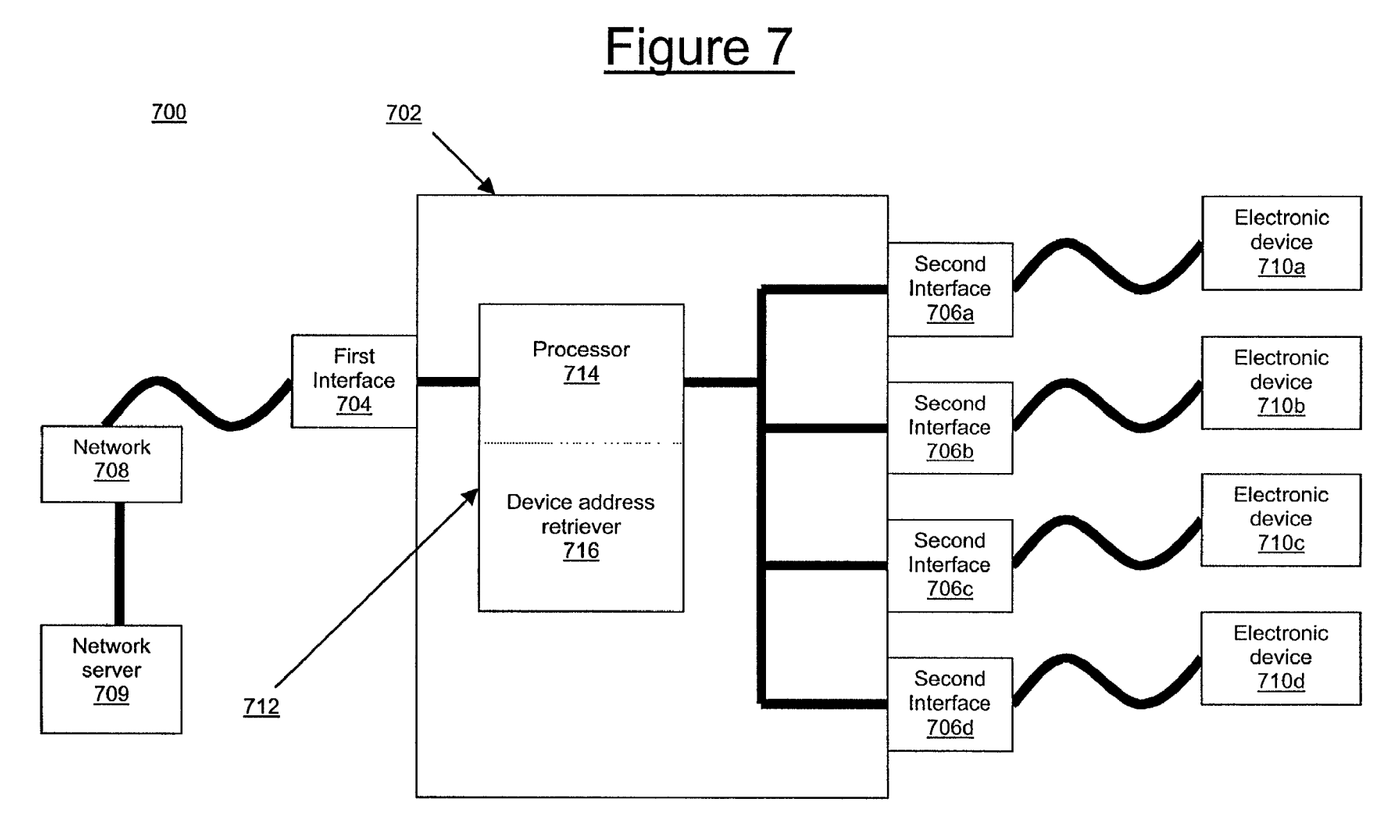
FIG. 7 is a block diagram of an intelligent data concentrator having a device address retriever configured for performing device address assigning functionality in accordance with an embodiment of the present invention.

FIG. 7 is a block diagram 700 of an intelligent data concentrator 702 having a device address retriever 716 configured for performing device address assigning functionality in accordance with an embodiment of the present invention. In one embodiment, intelligent data concentrator 702 is configured to perform a process for performing device address assigning functionality as described above in process 500 of FIG. 5.

Intelligent data concentrator 702 comprises a first interface 704 for communicatively coupling intelligent data concentrator 702 to network 708. Intelligent data concentrator 702 also comprises a plurality of second interfaces 706a-d for communicatively coupling intelligent data concentrator 702 to a plurality of electronic devices 710a-d. In one embodiment, second interfaces 706a-d are communication ports (e.g., communication ports 220 of FIG. 2). It should be appreciated that there can be any number of second interfaces 706a-d, and that the present invention is not meant to limit the number of second interfaces 706a-d. First interface 704 operating in conjunction with second interfaces 706a-d operates to connect electronic devices 710a-d to network 708.

Intelligent data concentrator 702 also comprises intelligence 712. In one embodiment, intelligence 712 comprises processor 714 coupled to the first interface 704 and status device address retriever 716 coupled to the means for processing and interpreting data 714. In one embodiment, processor 714 is a robust processor. In another embodiment, processor 714 is a central processing unit (CPU).

In one embodiment, device address retriever 716 is a software implementation in intelligent data concentrator 702. Alternatively, device address retriever 716 can be implemented by hardware or firmware (e.g., a software or firmware device address retriever).

In one embodiment, device address retriever 716 operates to obtain a device address for electronic devices connected to intelligent data concentrator 702 through second interfaces 706a-d by communicating with network server 709. In one embodiment, network server 709 is a DHCP server. In one embodiment, the device addresses are IP addresses.

Figure 8:
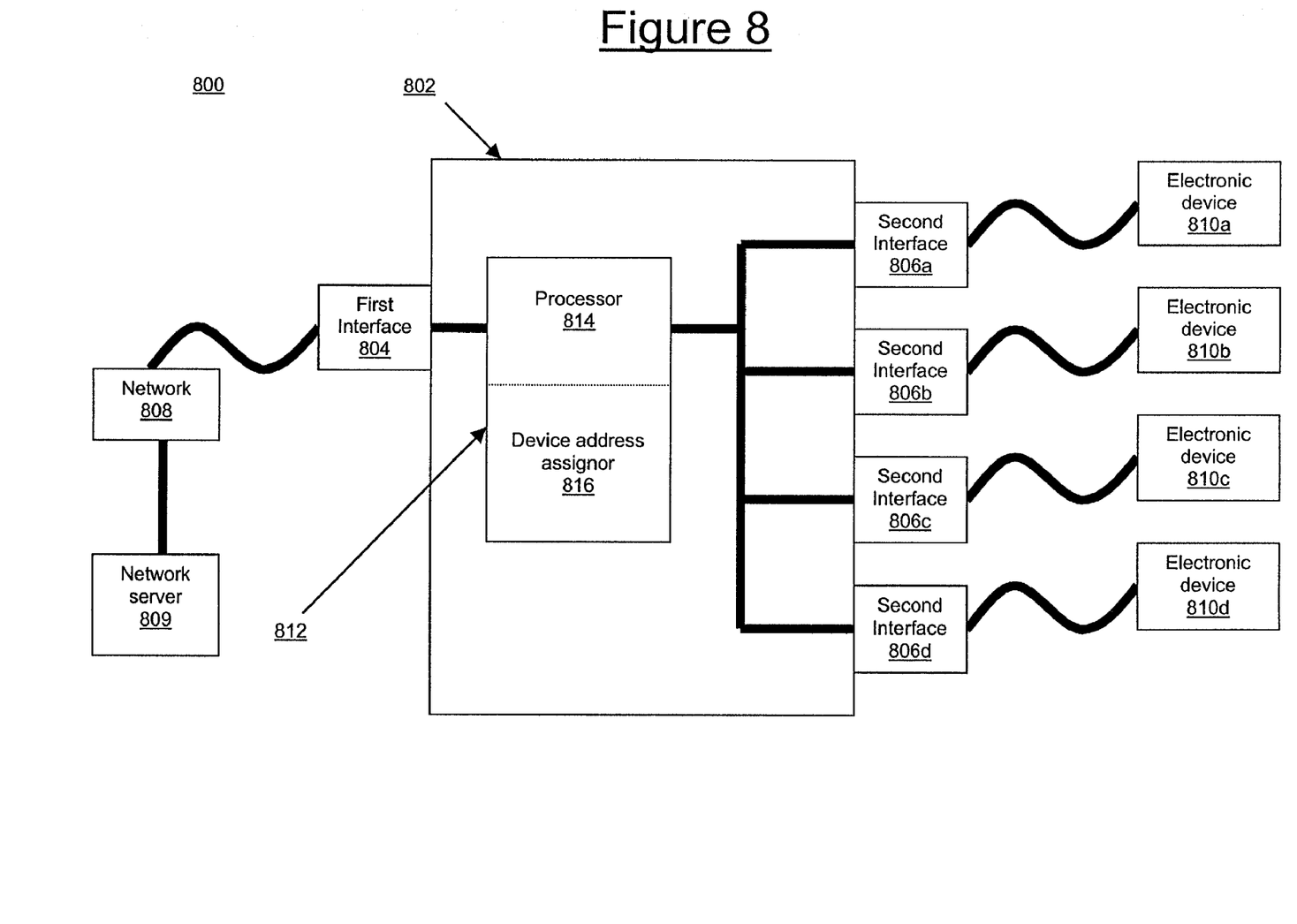
FIG. 8 is a block diagram of an intelligent data concentrator having a device address assignor configured for performing device address assigning functionality in accordance with an embodiment of the present invention.

FIG. 8 is a block diagram 800 of an intelligent data concentrator 802 having a device address assignor 816 configured for performing device address assigning functionality in accordance with an embodiment of the present invention. In one embodiment, intelligent data concentrator 802 is configured to perform a process for performing device address assigning functionality as described above in process 600 of FIG. 6.

Intelligent data concentrator 802 comprises a first interface 804 for communicatively coupling intelligent data concentrator 802 to network 808. Intelligent data concentrator 802 also comprises a plurality of second interfaces 806a-d for communicatively coupling intelligent data concentrator 802 to a plurality of electronic devices 810a-d. In one embodiment, second interfaces 806a-d are communication ports (e.g., communication ports 220 of FIG. 2). It should be appreciated that there can be any number of second interfaces 806a-d, and that the present invention is not meant to limit the number of second interfaces 806a-d. First interface 804 operating in conjunction with second interfaces 806a-d operates to connect electronic devices 810a-d to network 808.

Intelligent data concentrator 802 also comprises intelligence 812. In one embodiment, intelligence 812 comprises processor 814 coupled to the first interface 804 and device address assignor 816 coupled to the means for processing and interpreting data 814. In one embodiment, processor 814 is a robust processor. In another embodiment, processor 814 is a central processing unit (CPU).

In one embodiment, device address assignor 816 is a software implementation in intelligent data concentrator 802. Alternatively, device address assignor 816 can be implemented by hardware or firmware (e.g., a software or firmware device address assignor). In one embodiment, device address assignor 816 is a DHCP server.

In one embodiment, device address assignor 816 operates to assign a device address for electronic devices connected to intelligent data concentrator 802 through second interfaces 806a-d without requiring a separate device assigning server. In one embodiment, the device addresses are IP addresses. In one embodiment, intelligent data concentrator 802 has a pre-assigned device address.

The preferred embodiment of the present invention, a secure network outlet for supporting IP device address assigning functionality, is thus described. While the present invention has been described in particular embodiments, it should be appreciated that the present invention should not be construed as limited by such embodiments, but rather construed according to the below claims.

What is claimed is:

1. A method for performing device address assigning functionality in an intelligent data concentrator, said method comprising:
   receiving a network access request from a client device communicatively coupled to said intelligent data concentrator;
   transmitting a device address request to an Ethernet local area network (LAN) server communicatively coupled to said intelligent data concentrator;
   receiving a first device address from said Ethernet LAN server communicatively coupled to said intelligent data concentrator; and
   assigning a second device address to said client device communicatively coupled to said intelligent data concentrator;
   wherein said intelligent data concentrator is configured to be mounted internally within a wall such that a user-accessible surface of the intelligent data concentrator is external to and substantially planar with an exterior surface of the wall to provide direct access to said intelligent data concentrator; and wherein said intelligent data concentrator comprises:
- a first interface for communicatively coupling said intelligent data concentrator to a network, said network comprising said Ethernet LAN server;
- a second interface for communicatively coupling said intelligent data concentrator to a plurality of said client devices such that each said client device is communicatively coupled to said Ethernet LAN;
- a processor coupled to said first interface and said second interface; and
- a device address retriever coupled to said processor.

2. A method as recited in claim 1 wherein said first device address and said second device address are IP addresses.

3. A method as recited in claim 1 wherein said Ethernet LAN server comprises a DHCP server.

4. A method as recited in claim 1 wherein said first device address is the same as said second device address.

5. A method as recited in claim 1 wherein said first device address is a global device address.

6. A method as recited in claim 1 wherein said second device address is a private device address.

7. A method for performing device address assigning functionality in an intelligent data concentrator, said method comprising:
- receiving a network access request from a client device communicatively coupled to said intelligent data concentrator, said intelligent data concentrator having a first device address, wherein said intelligent data concentrator is configured to be mounted internally within a wall such that a user-accessible surface of the intelligent data concentrator is external to and substantially planar with an exterior surface of the wall to provide direct access to said intelligent data concentrator; and
- assigning a second device address to said client device communicatively coupled to said intelligent data concentrator, such that said intelligent data concentrator eliminates the need for a separate device address assigning server; and
- wherein said intelligent data concentrator comprises:
  - a first interface for communicatively coupling said intelligent data concentrator to an Ethernet local area network (LAN);
  - a second interface for communicatively coupling said intelligent data concentrator to a plurality of said client devices such that each said client device is communicatively coupled to said Ethernet LAN;
  - a processor coupled to said first interface and said second interface; and
  - a device address assignor coupled to said processor.

8. A method as recited in claim 7 wherein said first device address and said second device address are IP addresses.

9. A method as recited in claim 7 wherein said device address assignor is a DHCP server.

10. A method as recited in claim 7 wherein said first device address is the same as said second device address.

11. A method as recited in claim 7 wherein said first device address is a global device address.

12. A method as recited in claim 7 wherein said second device address is a private device address.

13. An intelligent data concentrator for performing device address assigning functionality, said intelligent data concentrator having a first device address, said intelligent data concentrator comprising:
- a housing configured to be installed internally within a wall;
- a first interface for communicatively coupling said intelligent data concentrator to an Ethernet local area network (LAN);
- a second interface for communicatively coupling said intelligent data concentrator to a plurality of client devices such that each said client device is communicatively coupled to said network, wherein said second interface is external to and substantially planar with an external surface of the wall to provide a plurality of communication ports, each communication port providing the communicative coupling for one of the plurality of client devices;
- a processor coupled to said first interface and said second interface; and
- a device address assignor coupled to said processor for assigning a second device address to said client device;
- wherein said first interface, said second interface, said processor and said device address assignor are comprised within said housing.

14. An intelligent data concentrator as recited in claim 13 wherein said first device address and said second device address are IP addresses.

15. An intelligent data concentrator as recited in claim 13 wherein said device address assignor is a DHCP server.

16. An intelligent data concentrator as recited in claim 13 wherein said first device address is the same as said second device address.

17. An intelligent data concentrator as recited in claim 13 wherein said first device address is a global device address.

18. An intelligent data concentrator as recited in claim 13 wherein said second device address is a private device address.

* * * * *